(12) United States Patent
Schultz et al.

(10) Patent No.: US 9,160,213 B2
(45) Date of Patent: Oct. 13, 2015

(54) METHOD AND SYSTEM FOR MOTOR THERMAL PROTECTION

(75) Inventors: Roy David Schultz, Erie, PA (US); Jeffrey Daigle, Erie, PA (US); Sudhir Gupta, Erie, PA (US)

(73) Assignee: General Electric Company, Schnectady, NY (US)

( * ) Notice: Subject to any disclaimer, the term of this patent is extended or adjusted under 35 U.S.C. 154(b) by 427 days.

(21) Appl. No.: 13/605,952

(22) Filed: Sep. 6, 2012

(65) Prior Publication Data

US 2014/0062371 A1    Mar. 6, 2014

(51) Int. Cl.
| | | |
|---|---|---|
| G05D 23/00 | (2006.01) | |
| H02K 9/04 | (2006.01) | |
| B60L 3/00 | (2006.01) | |
| B60L 7/14 | (2006.01) | |
| B60L 11/14 | (2006.01) | |
| B60L 15/20 | (2006.01) | |

(52) U.S. Cl.
CPC ................ *H02K 9/04* (2013.01); *B60L 3/0061* (2013.01); *B60L 7/14* (2013.01); *B60L 11/14* (2013.01); *B60L 15/2009* (2013.01); *B60L 2200/26* (2013.01); *B60L 2210/10* (2013.01); *B60L 2210/40* (2013.01); *B60L 2240/12* (2013.01); *B60L 2240/36* (2013.01); *B60L 2240/421* (2013.01); *B60L 2240/423* (2013.01); *B60L 2240/425* (2013.01); *B60L 2240/441* (2013.01); *B60L 2240/443* (2013.01); *B60L 2240/445* (2013.01); *B60L 2240/622* (2013.01); *B60L 2240/642* (2013.01); *B60L 2240/662* (2013.01); *B60L 2240/80* (2013.01); *B60L 2250/16* (2013.01); *Y02T 10/641* (2013.01); *Y02T 10/642* (2013.01); *Y02T 10/70* (2013.01); *Y02T 10/7077* (2013.01); *Y02T 10/7216* (2013.01); *Y02T 10/7241* (2013.01); *Y02T 10/7275* (2013.01); *Y02T 10/7291* (2013.01); *Y02T 90/16* (2013.01); *Y02T 90/162* (2013.01)

(58) Field of Classification Search
USPC .................................................. 318/445, 471
See application file for complete search history.

(56) References Cited

U.S. PATENT DOCUMENTS

| | | | |
|---|---|---|---|
| 5,425,338 A * | 6/1995 | Gottemoller | 123/358 |
| 5,446,362 A | 8/1995 | Vanek et al. | |
| 6,847,187 B2 | 1/2005 | Kumar | |
| 2003/0111976 A1* | 6/2003 | Kumar | 318/783 |
| 2005/0235744 A1* | 10/2005 | Ogawa | 73/146 |
| 2006/0138894 A1* | 6/2006 | Harada et al. | 310/217 |
| 2007/0272173 A1* | 11/2007 | Reckels et al. | 123/41.11 |
| 2009/0056385 A1* | 3/2009 | Maekawa | 68/12.16 |
| 2009/0167229 A1* | 7/2009 | Brunner et al. | 318/503 |
| 2009/0293760 A1* | 12/2009 | Kumar et al. | 105/59 |
| 2010/0073158 A1* | 3/2010 | Uesaka et al. | 340/450.2 |
| 2011/0106351 A1* | 5/2011 | Sah et al. | 701/22 |
| 2012/0230843 A1* | 9/2012 | Ravipati et al. | 417/46 |

* cited by examiner

*Primary Examiner* — Kawing Chan
(74) *Attorney, Agent, or Firm* — GE Global Patent Operation

(57) ABSTRACT

Various methods and systems are provided for regulating traction motor temperature via control of a traction motor blower. In one embodiment, a method comprises adjusting a speed of a traction motor blower based on ambient temperature, traction motor loss, and one or more traction motor temperatures.

20 Claims, 3 Drawing Sheets

METHOD AND SYSTEM FOR MOTOR THERMAL PROTECTION

FIELD

Embodiments of the subject matter disclosed herein relate to traction motors.

BACKGROUND

Traction motors may generate torque in order to rotate the wheels of an electric vehicle or a vehicle with an electrical transmission system, such as a diesel-electric locomotive. Under certain conditions, such as when ascending a hill, the level of power output by a traction motor may result in a rise in motor temperature that, if uncontrolled, may cause degradation to the motor. Alternately, high temperatures may initiate a derating strategy that limits motor temperatures by limiting vehicle performance. To counteract such temperature increases, a blower may be activated to direct air flow around and through the traction motor. The operation of the blower may compromise fuel economy, and thus the blower is typically configured to be activated when traction motor temperature reaches a threshold. However, waiting to activate the blower until a high temperature may cause the derating strategy to more quickly limit vehicle performance.

BRIEF DESCRIPTION

In one embodiment, a method comprises adjusting a speed of a traction motor blower based on ambient temperature, traction motor loss, and one or more traction motor temperatures.

In this way, in addition to basing the speed of the traction motor blower on the traction motor temperature, the ambient temperature and traction motor loss may be utilized to determine the traction motor blower speed. The traction motor loss may be used to provide an indication of motor effort and future motor temperature increases, which may be balanced by the current ambient temperature in order to sufficiently cool the traction motor without wasting fuel. Furthermore, future temperature rise can be limited by increased blower speed, thus avoiding derating of vehicle performance caused by elevated temperatures It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of controlling the speed of a blower configured to cool a fraction motor. During certain conditions, such as during periods of high motor output or high ambient temperatures, fraction motors used to provide torque to wheels of a vehicle may reach elevated temperatures that result in degradation to the traction motors. To keep a traction motor within a designated temperature range, a blower may be activated and its speed adjusted based on the temperature of the traction motor. Alternately, vehicle performance may be limited to levels that limit traction motor temperatures to safe levels. Further, to anticipate traction motor operation that may place stress on the motor, or require vehicle performance limits, but which may not yet be causing elevated temperatures, traction motor loss may also be utilized to adjust blower speed. The extent to which the blower is adjusted may be controlled based on ambient temperature and/or designated fuel economy.

Figure 1:
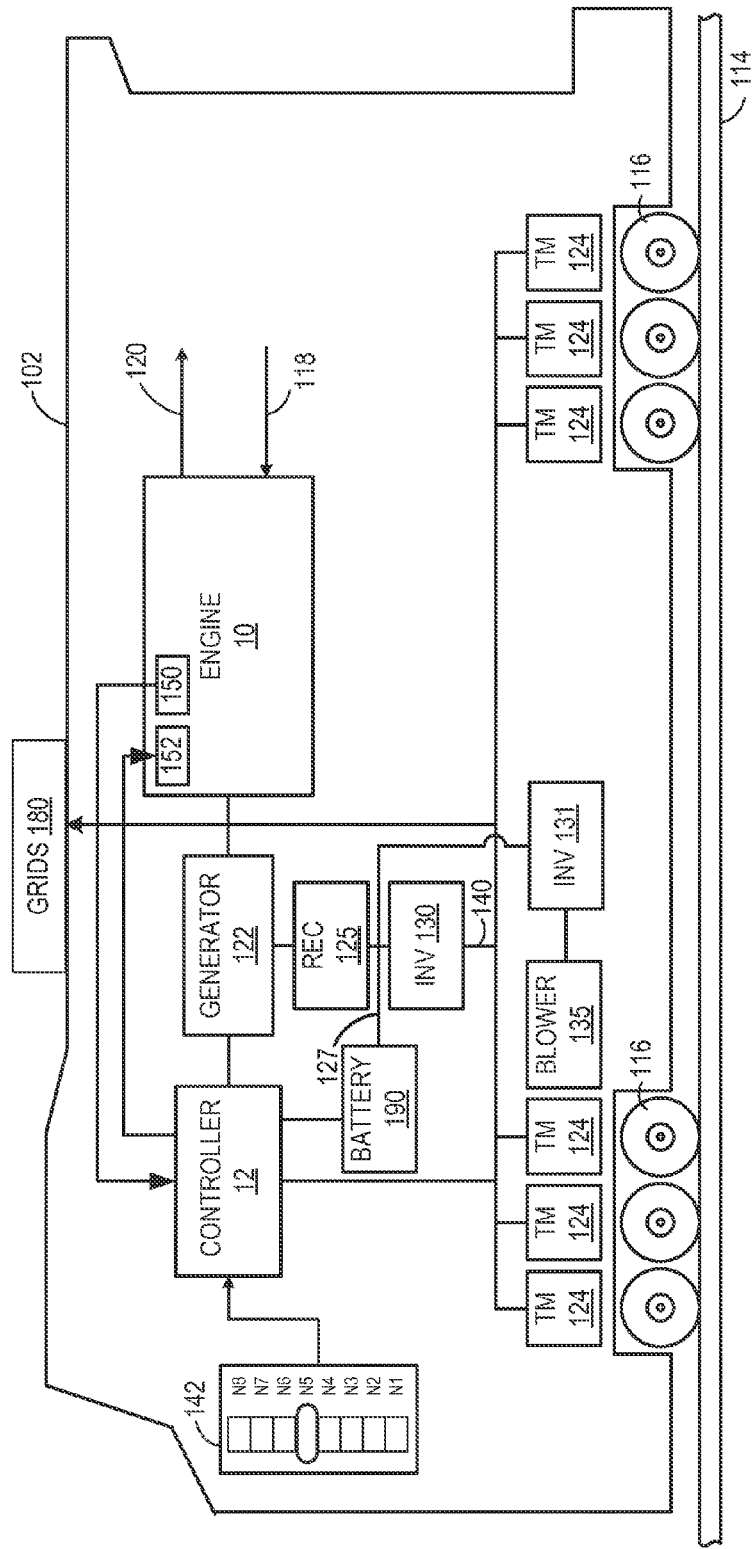
FIG. 1 shows a schematic diagram of a rail vehicle with a traction motor cooling system according to an embodiment of the invention.

FIG. 1 depicts an embodiment of a rail vehicle, herein depicted as a locomotive 102 including engine 10, configured to run on a rail 114 via a plurality of wheels 116. In one example, engine 10 may be a diesel engine. However, in alternate embodiments, alternate engine configurations may be employed, such as a gasoline engine, a biodiesel engine, a natural gas engine, or a gas turbine engine (turbojet, turbofan, turboprop, turboshaft), for example.

The engine 10 receives intake air for combustion from an intake passage 118. The intake passage 118 receives ambient air from an air filter (not shown) that filters air from outside of the locomotive 102. Exhaust gas resulting from combustion in the engine 10 is supplied to an exhaust passage 120. Exhaust gas flows through the exhaust passage 120 and out of an exhaust stack (not shown) of the locomotive 102.

In one embodiment, the locomotive 102 is a diesel-electric vehicle. As depicted in FIG. 1, the engine 10 is coupled to an electric power generation and propulsion system, which includes an alternator/generator 122 and electric fraction motors 124 ("TM"). For example, the engine 10 is a diesel engine that generates a torque output that is transmitted to the alternator/generator 122 along a drive shaft (not shown). The generated torque is used by alternator 122 to generate electricity for subsequent propulsion of the vehicle. Engine 10 may be run at a constant speed, thereby generating a constant horsepower (hp) output, or at variable speed generating variable horsepower output, based on operational demand. Alternator 122 may be connected in series to one or more rectifiers 125 ("REC") that convert the alternator's electrical output to DC electrical power. The DC power is transmitted through DC bus 127 to one or more inverters 130 ("INV") that may be configured to invert the electrical power from the electrical bus prior to supplying electrical power to the downstream traction motors. In one embodiment, inverter 130 may supply AC electrical power to a plurality of traction motors, and inverter 131 may supply electrical power to a traction motor blower 135 (explained in more detail below). In an alternate embodiment, each of a plurality of distinct inverters may supply electrical power to a distinct component.

A traction motor 124, mounted to wheel 116, may receive electrical power from inverter 130 through the AC bus 140 to provide traction power to propel the vehicle. Traction motor 124 may be an AC induction motor. Accordingly, an inverter paired with the traction motor may convert a DC input to an appropriate AC output, such as a three-phase AC output, which is provided as an input for powering the traction motor. One example of a vehicle configuration includes one inverter and one traction motor pair per driven wheel 116. Traction motor 124 may also be configured to act as a generator providing dynamic braking to brake locomotive 102. In particular, during dynamic braking, the traction motor may provide torque in a direction that is opposite from the rolling direction, thereby generating electricity that is dissipated as heat by a grid of resistors 180 connected to the electrical bus. In one example, the grid includes stacks of resistive elements connected in series directly to the electrical bus. The stacks of resistive elements may be positioned on a vehicle housing of locomotive 102 in order to facilitate air cooling and heat dissipation from the grid.

Furthermore, during operation of the locomotive, the temperature of the traction motor may increase. Accordingly, the traction motor may be force-air cooled. In particular, a traction motor blower 135 may blow air to cool the traction motor 124. The traction motor blower 135 may be powered by a traction motor blower motor that is configured to receive electrical power from the inverter 131. By powering the blower 135 by a separate inverter, the speed of the blower may be controlled independently of the fraction motor speed. It will be appreciated that locomotive 102 may include plural traction motor blowers to cool one or more traction motor(s).

An on-board electrical energy storage device, represented by battery 190 in this example, may also be linked to DC bus 127. A DC-DC converter (not shown) may be configured between DC bus 127 and battery 190 to allow the high voltage of the DC bus (for example in the range of 1000V) to be stepped down appropriately for use by the battery (for example in the range of 12-75V). In the case of a hybrid vehicle, the on-board electrical energy storage device may be in the form of high voltage batteries, such that the placement of an intermediate DC-DC converter may not be necessitated. The battery may be charged by running the engine 10. The electrical energy stored in the battery may be used during a stand-by mode of engine operation, or when the engine is shut down, to operate various electronic components such as lights, on-board monitoring systems, microprocessors, processor displays, climate controls, and the like. Battery 190 may also be used to provide an initial charge to start-up engine 10 from a shut-down condition. In alternate embodiments, electrical energy storage device 190 may be a super-capacitor, for example.

Locomotive 102 may include a throttle 142 coupled to engine 10 to indicate power levels. In this embodiment, the throttle 142 is depicted as a notch throttle. However, any suitable throttle is within the scope of this disclosure. Each notch of the notch throttle 142 may correspond to a discrete power level. The power level indicates an amount of load, or engine output, placed on the locomotive and controls the speed at which the locomotive will travel. Although eight notch settings are depicted in the embodiment of FIG. 1, in other embodiments, the throttle notch may have more than eight notches or less than eight notches, as well as notches for idle and dynamic brake modes. In some embodiments, the notch setting may be selected by a human operator of the locomotive 102. In other embodiments, a controller 12 may determine a trip plan (e.g., a trip plan may be generated using trip optimization software, such as Trip Optimizer™ system available from General Electric Company) including notch settings based on engine and/or locomotive operating conditions, as will be explained in more detail below.

Locomotive 102 further includes a controller 12 to control various components related to the locomotive 102. As an example, various components of the vehicle system may be coupled to the controller 12 via a communication channel or data bus. In one example, the controller 12 includes a computer control system. The controller 12 may additionally or alternatively include a memory holding non-transitory computer readable storage media (not shown) including code for enabling on-board monitoring and control of locomotive operation.

Controller 12 may receive information from a plurality of sensors and may send control signals to a plurality of actuators. The controller 12, while overseeing control and management of the locomotive 102, may be configured to receive signals from a variety of engine sensors 150, as further elaborated herein, in order to determine operating parameters and operating conditions, and correspondingly adjust various engine actuators 152 to control operation of the locomotive 102. For example, the controller 12 may receive signals from various engine sensors 150 including, but not limited to, engine speed, engine load, intake manifold air pressure, boost pressure, exhaust pressure, ambient pressure, ambient temperature, exhaust temperature, etc. Additional locomotive sensors may include locomotive position sensors (e.g., GPS device), environmental condition sensors (e.g., for sensing altitude, ambient humidity, temperature, and/or barometric pressure, or the like), locomotive coupler force sensors, a track grade sensor, locomotive notch sensors, brake position sensors, etc. Correspondingly, the controller 12 may control the locomotive 102 by sending commands to various components such as the traction motors 124, the alternator/generator 122, invertors 130, cylinder valves, fuel injectors, the notch throttle 142, etc. Other actuators may be coupled to various locations in the locomotive. Controller 12 may receive inputs from the various locomotive sensors, process the data, and trigger the locomotive actuators in response to the processed input data based on instruction or code programmed therein corresponding to one or more routines.

For example, the controller 12 may determine a trip plan based on information received from locomotive position sensors, environmental condition sensors, etc., as well as information received from a remote way-side controller. The trip plan may include information of the route the locomotive is taking, including features such as hills and tunnels. The controller 12 may then be provided with information regarding upcoming trip conditions, and may adjust operating parameters in anticipation of the upcoming conditions. In one example, in anticipation of an upcoming tunnel, the controller 12 may be configured to interrupt or delay certain engine operating parameters to prevent excessive heating of the exhaust, such as reduced air-to-fuel ratio, regeneration of exhaust aftertreatment devices, etc. In another example, the controller 12 may be configured to adjust the speed of the blower 135 to increase cooling of the traction motor 124 prior to entering the tunnel, in anticipation of increased ambient temperatures in the tunnel. In another embodiment, information of upcoming operating conditions may be entered manually by an operator, such as when the operator sees the vehicle approaching a tunnel or hill. In another embodiment, information of upcoming operating conditions is determined automatically other than by way of a trip plan, for example, with reference to an on-board or off-board route database that includes information of a route on which the vehicle is traveling.

Additionally, controller 12 may monitor the speed of locomotive 102 and/or traction motor 124 and regulate the speed of traction motor 124. For example, controller 12 may increase the voltage and/or frequency from inverter 130 to increase the torque supplied from traction motor 124. In another example, controller 12 may apply dynamic braking if the speed of traction motor 124 exceeds a speed threshold.

Figure 2:
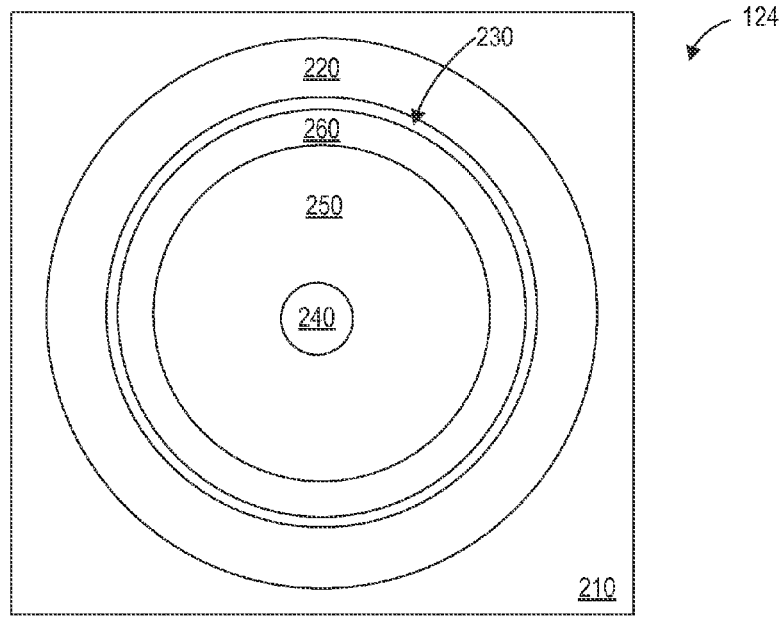
FIG. 2 shows a schematic diagram of a traction motor according to an embodiment of the invention.

FIG. 2 shows an embodiment of a fraction motor 124 comprising housing 210, stator 220, and rotor 230. Housing 210 includes a mounting surface for attaching traction motor 124 to a vehicle, such as locomotive 102. Housing 210 may also include cooling fins for cooling traction motor 124. Stator 220 includes one or more pairs of wound poles that may be connected to a source of AC power, such as AC bus 140. The poles are distributed in stator 220 to induce a rotating magnetic field around rotor 230 when AC power is applied. Stator 220 is coupled to housing 210 such that stator 220 is stationary with respect to housing 210. Stator 220 includes a cavity where rotor 230 may be inserted. Rotor 230 comprises shaft 240, punching assembly 250, end-ring 260, and a plurality of conductive bars (not shown in FIG. 2) arranged substantially parallel to the axis of rotor 230. End-ring 260 mechanically and electrically connects to one end of each of the plurality of conductive bars. A second end-ring (not shown in FIG. 2) mechanically and electrically connects to the other end of each of the plurality of conductive bars. Punching assembly 250 mechanically couples the plurality of conductive bars to shaft 240. When AC power is supplied to traction motor 124, a rotating magnetic field is generated by stator 220, which induces eddy currents in the plurality of conductive bars. The eddy currents interact with the rotating magnetic field causing the rotor to rotate about the axis of the rotor. Shaft 240 may be coupled to wheel 116 in a driving relationship through suitable gearing. In this manner, traction motor 124 may be used to provide torque to wheel 116 and move locomotive 102.

As described in more detail below, the temperature of the traction motor may be regulated by adjusting the speed of the traction motor blower. If the determined temperature of the traction motor exceeds a threshold temperature value (e.g., 30° C.), the blower may be activated. Further, the speed of the blower may be adjusted as the temperature of the traction motor changes. For example, the blower may be set to full speed if the traction motor temperature exceeds a second threshold temperature value, such as 150° C. In one embodiment, the temperature of the traction motor may be determined by a temperature sensor coupled to the housing of the traction motor. In another embodiment, a plurality of temperatures within the traction motor may be determined based on parameters including ambient temperature, ambient pressure, engine speed, and traction motor operating parameters such as motor speed, motor torque, voltage, etc. The temperature of the stator 220, rotor 230, and end-ring 260 (including both a first, inlet-side end-ring and a second, outlet-side end-ring) may be determined using various combinations of the above parameters.

Figure 3:
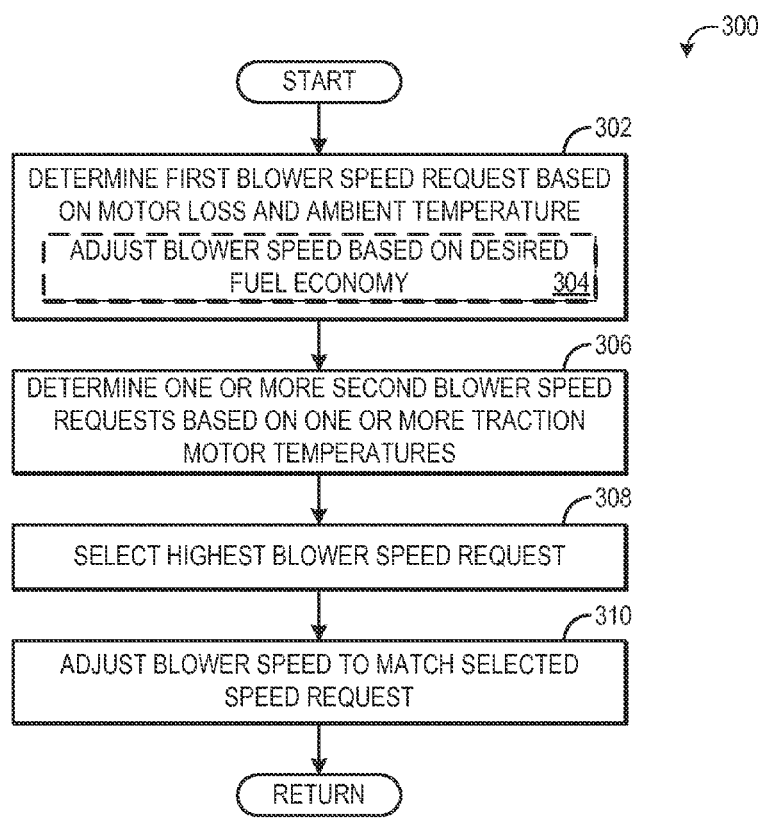
FIG. 3 is a flow chart illustrating a method for adjusting traction motor blower speed according to an embodiment of the invention.

Turning to FIG. 3, a method 300 for controlling a traction motor blower speed is illustrated. Method 300 may be carried out by controller 12 according to instructions stored thereon to regulate the temperature of a traction motor, such as traction motor 124, via control of a blower, such as blower 135. Method 300 adjusts blower speed based not only on the temperature of the traction motor described above, but also based on the ambient temperature and motor loss.

Method 300 comprises, at 302, determining a first blower speed request based on ambient temperature and motor loss. To prevent the traction motor from reaching high temperatures that may degrade the motor or require limiting vehicle performance, the blower may be activated or its speed increased before the motor reaches the high temperatures. To predict motor operation that may result in high temperatures (e.g., temperatures greater than 30° C.), the first blower speed request is based on traction motor losses. Traction motor loss as used herein includes the reduction in efficiency (e.g., defined by electrical power delivered to the motor and mechanical power generated at the motor output shaft) that the motor experiences due to increases in friction, energy lost as heat, copper losses, rotor copper losses, core losses, etc. Thus, traction motor loss refers the power loss (measured in watts) that occurs internally to the motor. These losses manifest as heat and cause the motor temperature to rise. A relatively high level of motor loss may be indicative of elevated motor effort, which leads to increased temperatures. The first blower speed request may be modulated by the current ambient temperature. For example, if the ambient temperature is low, the first blower speed request may be a relatively slow speed even if the motor losses are relatively high, as the cold ambient temperature may provide protection from rising motor temperatures due to the effort of the motor.

The first blower speed request may be determined based on the following equation:

$$\text{AirFlowRequest} = M^*\text{Loss}_{motor} + S^*T_{ambient} + O$$

Where M is a slope that defines the rate of change of the air flow request with motor loss (CFM/kwatt, or m$^3$/sec·kW), S is a parameter which determines the rate of change of the air flow request with ambient temperature (CFM/C.°, or m$^3$/sec·C.°), and O is a fixed constant air flow. As used herein, the ambient temperature and pressure refers to the temperature and pressure of the air within the vehicle in which the traction motor is installed, such as a temperature and pressure of air within a vicinity of the fraction motor, e.g., a temperature and pressure within a compartment or space that holds the motor, or within a half-meter spacing from the traction motor (for example). In some embodiments, the ambient temperature and pressure may be measured by sensors located in any position within the vehicle, while in other embodiments, the ambient temperature and pressure may be measured by sensors located near the traction motor. The air flow request determined by the above equation may then be used to select a designated blower speed request that provides the determined air flow.

The motor loss may be determined based on a ratio of the motor output power to the electrical input power. In another embodiment, the motor loss may be determined based on the rotor slip speed and the speed of the fraction motor. In yet a further embodiment, the traction motor loss may be determined based on the current applied to the traction motor (from the inverter, for example). Any mechanism for determining motor loss is within the scope of this disclosure.

The terms M, S, and O from the above equation may be tuned to provide a desired relationship between the motor loss, ambient temperature, and blower speed request. In one example, as indicated at 304 of method 300, the blower speed may be adjusted based on designated fuel economy by adjusting the values of the terms M, S, and/or O. Operating the blower reduces fuel economy, and thus in one example, if increased fuel economy is designated (e.g., requested by the controller, indicated in a trip plan, requested by an operator, or the like), M may be decreased in order to reduce the impact of the motor losses on the adjustment to the blower speed.

The blower may be a variable speed blower configured to operate at a plurality of speeds between deactivated and fully activated. As such, the air flow request determined by the above equation may correlate linearly with a blower speed, e.g., as the air flow request increases, the blower speed request increases. In other embodiments, the blower may be configured to operate at two or three speeds, such as off, half-activated, and fully activated. In such embodiments, all air flow requests above a first threshold and a below a second threshold may result in the blower being half-activated, while all air flow requests above the second threshold may result in the blower being fully activated.

At 306, one or more second blower speed requests are determined based on one or more traction motor temperatures. As explained above, an overall traction motor temperature may be determined, for example, based on signals from a temperature sensor coupled to the traction motor. In this case, a single second speed request may be determined based on the one motor temperature. In other embodiments, multiple traction motor temperatures may be determined, and each traction motor temperature may be used to determine a blower speed request. In one example, a blower speed request may be based on the stator temperature, another blower speed request may be based on the rotor temperature, and a final blower speed request may be based on the outlet-side end-ring temperature. For each temperature, the corresponding blower speed request may be determined based on a linear relationship (as the motor temperature increases, the blower speed request increases). If the blower operates at only two or three speeds as described above, all temperatures above a first threshold (e.g., 30° C.) and below a second threshold (e.g., 150° C.) may result in the blower being half-activated, while all temperatures above the second threshold may result in the blower being fully activated.

At 308, the highest of all the above-determined blower speed requests is selected, and at 310, the blower speed is adjusted to the selected speed request.

Thus, in one embodiment, method 300 of FIG. 3 provides for a method including adjusting a speed of a traction motor blower based on ambient temperature, traction motor loss, and one or more traction motor temperatures. The fraction motor loss may be determined based on a ratio of motor output to electrical input power, and the one or more traction motor temperatures may comprise a stator temperature, a rotor temperature, and/or an outlet rotor end-ring temperature.

The speed of the traction motor blower may be adjusted by determining a first blower speed request based on ambient temperature and fraction motor loss, determining one or more second blower speed requests based on the one or more traction motor temperatures, selecting a highest blower speed request from among the first blower speed request the one or more second blower speed requests, and adjusting the traction motor blower speed to the selected speed.

A third blower speed request may be determined based on a predicted ambient temperature and traction motor loss for an upcoming operating condition, and the highest blower speed request from among the first speed request, one or more second speed requests, and third speed request may be selected and the blower speed adjusted to the selected speed.

While the method described above utilizes current ambient temperature and motor losses to determine the first blower speed request, it may be beneficial in some circumstances to predict future ambient temperatures and/or motor losses, and adjust the blower speed prior to encountering the changed ambient temperature and motor loss. In doing so, the motor may be maintained below a designated temperature. This also allows operation at high tractive efforts for longer periods of time before reducing vehicle performance. This allows, for example, the vehicle to climb a longer hill before temperatures are reached that cause vehicle performance limits.

Figure 4:
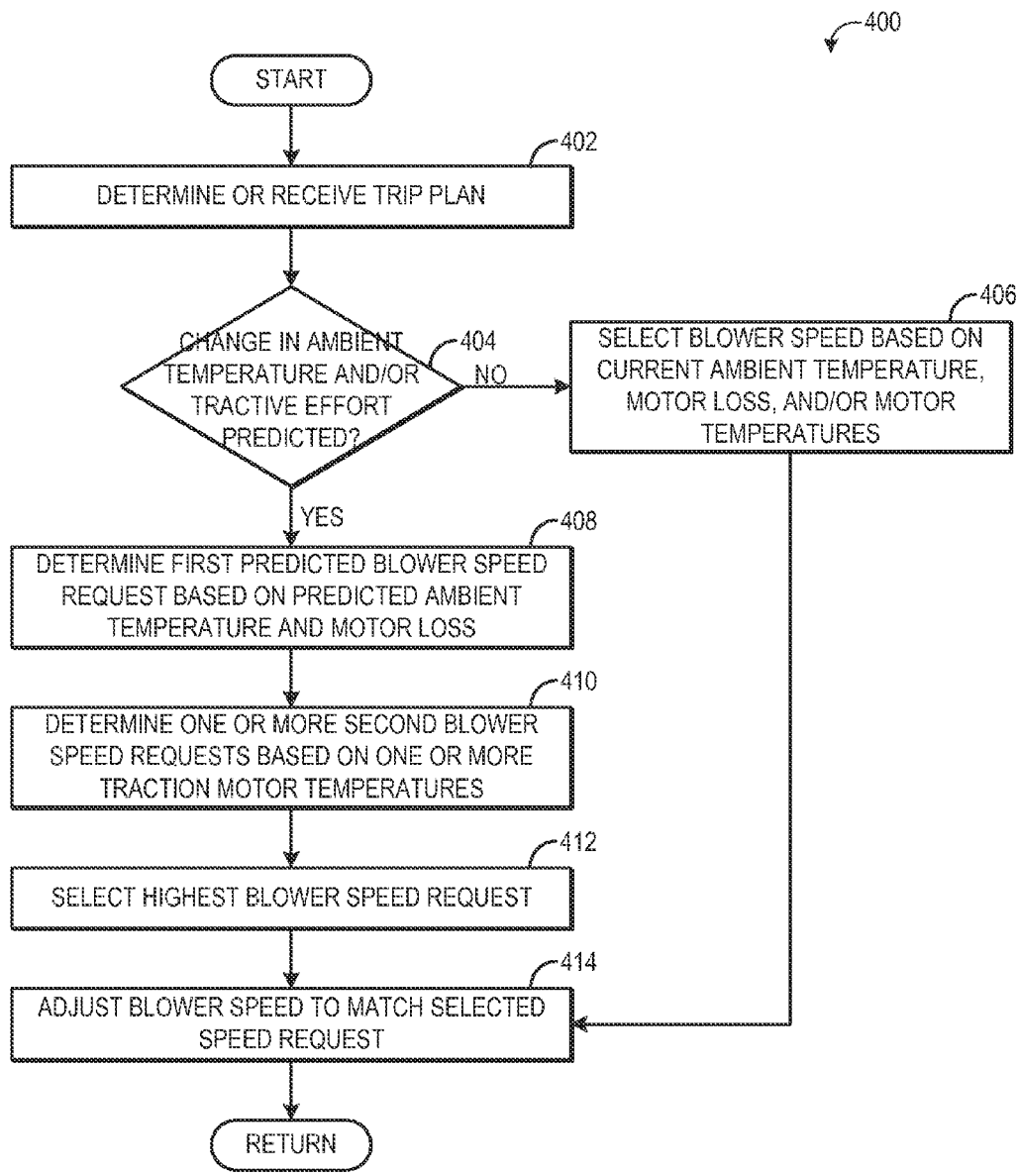
FIG. 4 is a flow chart illustrating a method for adjusting traction motor blower speed according to another embodiment of the invention.

FIG. 4 illustrates a method 400 for adjusting blower speed based on predicted operating conditions. Method 400 may be carried out by controller 12 to regulate the speed of blower 135 to cool traction motor 124. Method 400 comprises, at 402, determining or receiving a trip plan. As explained previously, the controller may be configured to receive vehicle position information (from a GPS sensor, for example), track grade information, etc., and may be configured to determine a trip plan based on the received information. In other embodiments, the trip plan may be determined by a remote controller and sent to the controller. The trip plan may include a plurality of track conditions for the route the vehicle will be taking during a given trip. The track conditions may include geographic features such as hills and tunnels, predicted weather for each segment of track, etc. The trip plan may be utilized to determine vehicle speed and load over the course of the trip.

Based on the trip plan, at 404 it is determined if a change in ambient temperature and/or tractive effort of the vehicle is predicted. A change in ambient temperature may be predicted if the vehicle is about to enter a tunnel (where ambient temperatures tend to increase), if the vehicle is about to enter a different climate zone (for example, by increasing or decreasing in elevation) or encounter a shift in weather, etc. A change in tractive effort may be predicted if the vehicle is about to ascend or descend a hill. The change in ambient temperature or tractive effort may be predicted a threshold time or distance from the region where the change is to occur. For example, the change in ambient temperature may be predicted thirty seconds before entering a tunnel, or other suitable time or distance.

If a change in ambient temperature or tractive effort is not predicted, method 400 proceeds to 406 to continue to select the blower speed based on current ambient temperature, motor loss, and/or motor temperatures, as explained above with respect to FIG. 3. Method 400 then proceeds to 414 to adjust the blower speed to match the selected speed request, and then method 400 returns.

Referring back to 404, if it is determined that a change in ambient temperature or tractive effort is predicted, method 400 proceeds to 408 to determine a first predicted blower speed request based on the predicted ambient temperature and motor loss. The trip plan may include upcoming conditions that may be used to predict the ambient temperature and motor loss. For example, a predicted ambient temperature in a tunnel may be based on current ambient temperature, length of the tunnel, location of the tunnel (both geographically and within a hill or other structure), etc. Predicted motor loss may be based on the upcoming grade of the track, upcoming predicted speed and load for the vehicle, etc. The predicted ambient temperature and motor loss may be used to determine the first predicted speed request in the same equation described above with respect to FIG. 3. Further, the first predicted speed request may be adjusted based on designated fuel economy, as described above.

At 410, one or more second blower speed requests are determined based on one or more traction motor temperatures, similar to the second speed requests determined in method 300 of FIG. 3. The current traction motor temperatures may be used to determine the one or more second blower speed requests. However, the motor temperatures may also be predicted motor temperatures, as the upcoming conditions, including upcoming ambient temperature, pressure, etc., may impact the motor temperatures.

At 412, the highest blower speed request from among the first predicted blower speed request and the one or more second blower speed requests is selected, and at 414, the blower speed request is adjusted to the selected speed. Method 400 then returns.

Thus, in one embodiment, a method comprises adjusting air flow provided by a traction motor blower to a traction motor to maintain a designated traction motor temperature (e.g., a traction motor temperature that has been selected/identified, based on the physical and operational characteristics of the motor or otherwise, at which to maintain the motor to avoid degradation generally, or to avoid degradation above a particular degree or rate), the air flow adjusted based on a predicted ambient temperature and predicted traction motor loss for an upcoming operating condition. The predicted traction motor loss may be determined based on predicted tractive effort during the upcoming operating condition, and the predicted ambient temperature may be determined based on a current ambient temperature and an estimated change in ambient temperature during the upcoming operating condition. The change in ambient temperature during the upcoming operating condition may include an increase in ambient temperature due to the vehicle in which the traction motor is installed entering a tunnel, a decrease in ambient temperature due to the vehicle gaining elevation, etc.

In another embodiment, a motor cooling system comprises a fraction motor blower to provide air flow to a traction motor; and a controller configured to adjust a speed of the traction motor blower based on ambient temperature, traction motor loss, and one or more traction motor temperatures. The controller may be further configured to adjust the speed of the traction motor further based on a designated fuel economy, and/or on a plurality of traction motor temperatures. A first speed request may be determined based on the ambient temperature and traction motor loss, and the first speed request may be adjusted based on designated fuel economy. A plurality of additional speed requests may be determined based the plurality of traction motor temperatures, and the controller may be configured to select a highest speed request from among the first speed request and the plurality of additional speed requests and adjust the speed of the traction motor blower to the selected highest speed. The controller may be configured to increase the first speed request as traction motor loss increases, increase the first speed request as ambient temperature increases, and decrease the first speed request as designated fuel economy increases.

The systems and methods described herein provide for a system comprising a traction motor configured to transmit torque produced by an engine to a wheel in order to propel a vehicle. A traction motor blower is positioned near the traction motor, and the traction motor blower may be regulated to maintain the temperature of the traction motor below a designated temperature. A controller is configured to adjust the speed of the traction motor blower based on ambient temperature, fraction motor loss, and one or more traction motor temperatures. The controller may be configured to determine traction motor loss based on a ratio of motor output to motor input, or the controller may be configured to determine traction motor loss based on the amount of current applied to the fraction motor.

In embodiments, a system for a vehicle comprises a traction motor, traction motor blower, and a controller. The controller may be configured to receive or a determine a trip plan which includes current and future operating conditions based on track conditions anticipated on the route which the vehicle is taking. The track conditions may include geographic features such as hills and tunnels, anticipated weather conditions, and other conditions. Vehicle speed and load may be determined for each segment of the route based on the track conditions. Further, ambient temperature and traction motor loss may be predicted for upcoming segments of the route. The controller may be configured to adjust air flow provided to the traction motor by the traction motor blower based on predicted ambient temperature, predicted motor loss, and/or one or more traction motor temperatures.

In another embodiment, a method for controlling a vehicle comprises adjusting a speed of a traction motor blower operably disposed in the vehicle. The vehicle includes a traction motor for propelling the vehicle, and the traction motor blower is fluidly coupled with the fraction motor for cooling the traction motor when the traction motor blower is powered to propel air over/around/through the traction motor. According to the method, the speed of the fraction motor blower is adjusted based on ambient temperature, traction motor loss of the traction motor, and one or more traction motor temperatures of the traction motor.

In another embodiment, a method for controlling a vehicle comprises adjusting air flow provided by a traction motor blower operably disposed in the vehicle. The vehicle includes a traction motor for propelling the vehicle, and the traction motor blower is fluidly coupled with the traction motor for cooling the traction motor when the traction motor blower is powered to propel air over/around/through the traction motor. According to the method, the air flow provided by the traction motor blower is adjusted to maintain a designated traction motor temperature of the traction motor, a predicted ambient temperature, and a predicted traction motor loss for an upcoming operating condition of the vehicle.

In another embodiment, a vehicle comprises a fraction motor configured to propel the vehicle, and a traction motor blower to provide air flow to the traction motor. The vehicle further comprises a controller configured to adjust a speed of the traction motor blower based on ambient temperature, traction motor loss of the traction motor, and one or more traction motor temperatures of the traction motor.

Although some embodiments are described with respect to locomotives and other rail vehicles, aspects of the invention are applicable to vehicles generally, including marine vessels (e.g., a traction motor turning a propeller), on-road transportation vehicles, off-highway vehicles other than rail vehicles (such as mining equipment and construction equipment), and the like. Further, other embodiments may be applicable to other systems where a traction motor is used to drive a load, such as stationary generator sets, drill rig motors, or the like. Thus, in embodiments, the traction motor is a motor used to propel a vehicle, and in other embodiments, the traction motor is otherwise a relatively large motor (e.g., at least 200 kW; at least 500 kW; at least 800 kW; at least 1000 kW; or at least 1500 kW) used to convert electrical power to a mechanical power for driving a load. As one example, an upcoming operating condition of a fraction motor, such as in a drill or other stationary system, may be predicted based on an operating schedule or pre-established duty cycle of the traction motor.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
adjusting a speed of a traction motor blower based on ambient temperature, traction motor loss, and one or more traction motor temperatures, the adjusting the speed of the traction motor blower comprising:
determining a first blower speed request based on the ambient temperature and the traction motor loss, and determining one or more second blower speed requests based on the one or more traction motor temperatures, the first blower speed request based on a traction motor loss parameter that is separate from the one or more traction motor temperatures; and
selecting a highest blower speed request from among the first blower speed request and the one or more second blower speed requests, and adjusting the traction motor blower speed to the highest blower speed that is selected.

2. The method of claim 1, wherein the traction motor blower directs air flow to the traction motor in order to cool the traction motor.

3. The method of claim 1, wherein the traction motor loss is determined based on a ratio of motor output to electrical input power.

4. The method of claim 1, wherein the one or more traction motor temperatures comprise a stator temperature, a rotor temperature, and outlet rotor end-ring temperature.

5. The method of claim 1, further comprising determining a third blower speed request based on a predicted ambient temperature and a predicted traction motor loss for an upcoming operating condition.

6. The method of claim 1, wherein the traction motor loss is determined based on one or more of an amount of current applied to the traction motor, traction motor rotor slip speed, and a speed of the traction motor.

7. A method comprising:
determining if a change in one or more of an ambient temperature or tractive motor effort is predicted for an upcoming operating condition;
if a change is predicted, adjusting air flow provided by a traction motor blower to a traction motor to maintain a designated traction motor temperature, based on a predicted ambient temperature and a predicted traction motor loss for the upcoming operating condition; and
if a change is not predicted, adjusting air flow provided by the traction motor blower based on current ambient temperature, traction motor loss, and one or more traction motor temperatures.

8. The method of claim 7, wherein the predicted traction motor loss is determined based on predicted tractive effort during the upcoming operating condition, and wherein the predicted ambient temperature is determined based on a current ambient temperature and an estimated change in ambient temperature due to the upcoming operating condition.

9. The method of claim 7, wherein the traction motor blower and traction motor are installed in a rail vehicle, and wherein the upcoming operating condition comprises the rail vehicle entering a tunnel.

10. The method of claim 7, wherein the traction motor blower and traction motor are installed in a rail vehicle, and wherein the upcoming operating condition comprises the rail vehicle ascending or descending a hill.

11. The method of claim 7, wherein adjusting air flow provided by the traction motor blower based on current ambient temperature, traction motor loss, and one or more traction motor temperatures comprises:
determining a first blower speed request based on the current ambient temperature and the traction motor loss, the first blower speed request based on a traction motor loss parameter that is separate from the one or more traction motor temperatures;
determining one or more second blower speed requests based on the one or more traction motor temperatures;
selecting a highest blower speed request from among the first blower speed request and the one or more second blower speed requests; and
adjusting air flow provided by the traction motor blower according to the highest blower speed that is selected.

12. The method of claim 11, wherein the traction motor loss is determined based on one or more of an amount of a ratio of motor output to electrical input power, current applied to the traction motor, traction motor rotor slip speed, and a speed of the traction motor.

13. A motor cooling system, comprising:
a traction motor blower to provide air flow to a traction motor; and
a controller configured to adjust a speed of the traction motor blower based on ambient temperature, traction motor loss, and one or more traction motor temperatures, the traction motor loss determined based on a motor loss parameter that is separate from the one or more traction motor temperatures.

14. The motor cooling system of claim 13, wherein the controller is configured to determine a first blower speed request based on the ambient temperature and the traction motor loss.

15. The motor cooling system of claim 14, wherein the controller is configured to adjust the speed of the traction motor blower further based on a designated fuel economy, and wherein the controller is further configured to adjust the first blower speed request based on the designated fuel economy.

16. The motor cooling system of claim 14, wherein the one or more traction motor temperatures comprises a plurality of traction motor temperatures, and wherein the controller is configured to determine a plurality of additional blower speed requests based the plurality of traction motor temperatures.

17. The motor cooling system of claim 16, wherein the controller is configured to select a highest blower speed request from among the first blower speed request and the plurality of additional blower speed requests and to adjust the speed of the traction motor blower to the highest blower speed that is selected.

18. The motor cooling system of claim 14, wherein the controller is configured to increase the first blower speed request as the traction motor loss increases, and increase the first blower speed request as the ambient temperature increases.

19. The motor cooling system of claim 14, wherein the controller is configured to adjust the speed of the traction motor blower further based on a designated fuel economy, and wherein the controller is further configured to decrease the first blower speed request as the desired fuel economy increases.

20. The motor cooling system of claim 13, wherein the traction motor loss is determined based on an amount of current applied to the traction motor.

* * * * *